United States Patent
Thomas, III

(10) Patent No.: US 7,697,391 B2
(45) Date of Patent: Apr. 13, 2010

(54) MASSIVELY MULTI-LEVEL OPTICAL DATA STORAGE USING SUBWAVELENGTH SIZED NANO-GRATING STRUCTURES

(75) Inventor: Fred C Thomas, III, Ogden, UT (US)

(73) Assignee: EMC Corporation, Hopkinton, MA (US)

(*) Notice: Subject to any disclaimer, the term of this patent is extended or adjusted under 35 U.S.C. 154(b) by 1149 days.

(21) Appl. No.: 11/311,565

(22) Filed: Dec. 19, 2005

(65) Prior Publication Data

US 2006/0221796 A1 Oct. 5, 2006

Related U.S. Application Data

(60) Provisional application No. 60/637,962, filed on Dec. 20, 2004, provisional application No. 60/696,054, filed on Jul. 1, 2005.

(51) Int. Cl.
*G11B 7/00* (2006.01)

(52) U.S. Cl. .................. 369/109.01; 369/112.03; 369/103; 977/943

(58) Field of Classification Search ............ 369/112.01, 369/112.03–112.07, 112.1, 109.01, 109.02, 369/110.02, 110.03, 103
See application file for complete search history.

(56) References Cited

U.S. PATENT DOCUMENTS

| | | | | | |
|---|---|---|---|---|---|
| 5,689,603 | A | * | 11/1997 | Huth | 385/131 |
| 6,052,238 | A | * | 4/2000 | Ebbesen et al. | 359/738 |
| 7,189,435 | B2 | * | 3/2007 | Tuominen et al. | 427/472 |
| 7,318,907 | B2 | * | 1/2008 | Stark et al. | 422/50 |
| 2004/0120041 | A1 | * | 6/2004 | Silverstein et al. | 359/486 |
| 2006/0075418 | A1 | * | 4/2006 | Kurt et al. | 720/718 |
| 2009/0001289 | A1 | * | 1/2009 | Oakley | 250/492.3 |

* cited by examiner

*Primary Examiner*—Thang V Tran
(74) *Attorney, Agent, or Firm*—Stephen C. Beuerle; Procopio Cory Hargreaves & Savitch LLP

(57) ABSTRACT

An information storage apparatus uses an optical data element (nano-grating) with features that are smaller than the wavelength of light. The optical data element alters one or more properties of the light such as reflected amplitude, polarization, phase, wavelength, and spatial orientation to encode data in a massively multi-level format.

10 Claims, 5 Drawing Sheets

Features of Phase and Amplitude Nano-grating Optical Data Elements

ARC - top

Overcoat

Core

Nano-structured

Reflective layer

Substrate

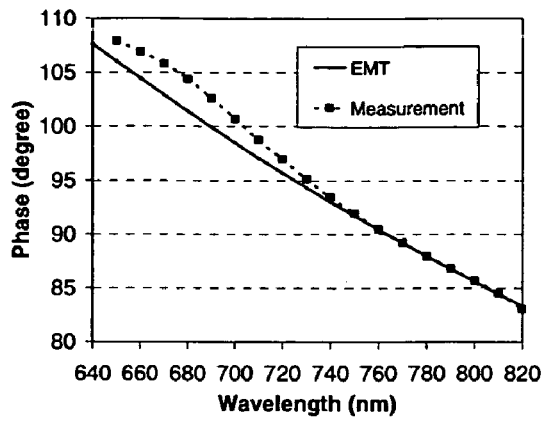
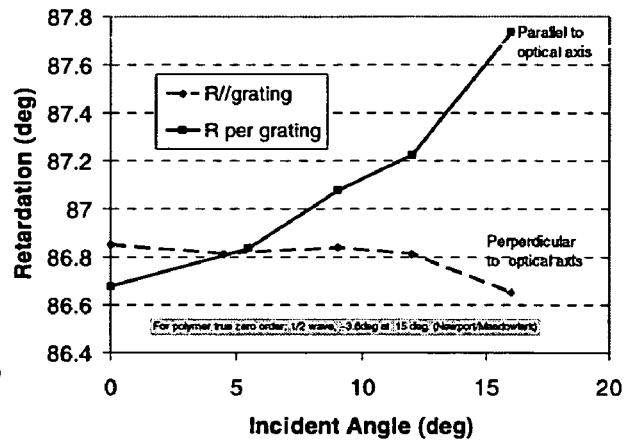
Figure 6a
Figure 6b
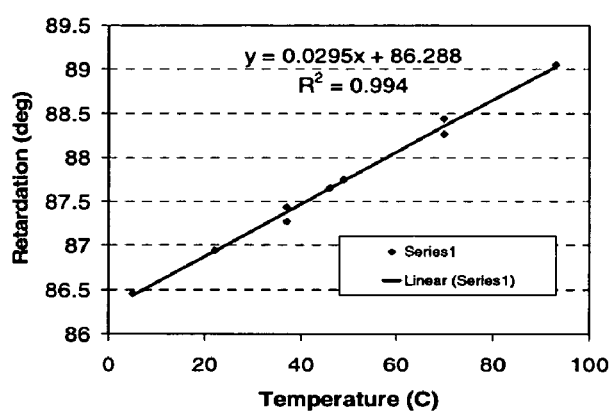
Figure 6c.

MASSIVELY MULTI-LEVEL OPTICAL DATA STORAGE USING SUBWAVELENGTH SIZED NANO-GRATING STRUCTURES

CROSS-REFERENCE TO RELATED APPLICATIONS

The present application claims priority from U.S. Provisional Application 60/637,962 filed Dec. 20, 2004 and U.S. Provisional Application 60/696,054 filed Jul. 1, 2005. The application also expands on the disclosure of U.S. Pat. No. 6,879,556, issued Apr. 12, 2005. The content of each provisional application and the issued patent is incorporated by reference herein.

TECHNICAL FIELD

This invention relates in general to data storage techniques and, more particularly, to techniques for optically storing and retrieving data.

BACKGROUND

Over the past twenty years, computer technology has evolved very rapidly. One aspect of this evolution has been a progressively growing demand for increased storage capacity in memory devices, especially where the information storage medium is some form of removable component. In this regard, just a little over a decade ago, the typical personal computer had a floppy disk drive which accepted floppy disk cartridges that contained a 5.25" disk with a storage capacity up to about 720 kilobytes (KB) per cartridge. Not long thereafter, these devices gave way to a new generation of floppy disk drives which accepted smaller floppy disk cartridges that contained a 3.5" disk with higher storage capacities, up to about 1.44 MB per cartridge.

Subsequently, as the evolution continued, a further significant increase in storage capacity was realized in the industry by the introduction of the removable optical disk. One such optical disk is commonly known as a compact disk (CD). Even more recently, a further type of optical disk was introduced, and is commonly known as a Digital Versatile Disk (DVD).

The compact disk has an information storage surface with a plurality of tracks that each have therealong a series of optical data pits of variable length. This variable pit length recording is termed run-length-limited (RLL) encoding. By using RLL, present optical data storage products (CD and DVD) are able to encode information onto an optical media with pit lengths shorter than the spot size of a laser stylus used for recording and reading data in these products. In order is used. This rule set for present optical products (CD and DVD) converts data bits into recorded channel bits with a 1:2 efficiency. That is, two optical media recorded channel bits are used to encode one data bit. This is thus part of the factors that define what size media area under present optical data storage standards can be considered to be a single bit optical data element. An optical data element hence is the area required for storage of one basic unit of information on the data storage media. For CD and DVD technologies, this basic unit is one bit ("1" or "0") of data. For example, with the requirements of RLL overhead factored in, the size of a CD optical data element storing one bit of user data has a size of about 1.6 microns by 0.56 microns.

The DVD disk has either one or two layers of information storage surfaces, only one of which is read or written at any given point in time. Each information storage surface includes a plurality of tracks that, like a compact disk, each have therealong a series of optical data elements reduced in size and configuration from that of the optical data elements of a compact disk. In particular, for each optical data element, which represents a user single binary bit which is a binary "0" or "1", the user optical data element size is reduced to about 0.74 microns by 0.26 microns. The similarity between the formats from the optical data element size perspective is that the approximate ratio in the dimensions is 3:1. The larger of the two dimensions is the data track pitch in both the CD and DVD case.

Although these pre-existing optical disks have been generally adequate for their intended purposes, there is still a progressively growing demand for increased storage capacity in optical storage media. In addition, there is also a need for an increase in the rate at which information can be read from optical media. Also, to the extent that some form of higher capacity optical media is provided, it is desirable that it have a cost per unit which is in approximately the same range as the cost of existing compact disks or DVD disks. Further, to the extent that some such higher capacity optical media is provided, it is desirable that a detection system capable of reading it be compatible with pre-existing compact disks and/or DVD disks, while having a cost which is not significantly greater than that of existing detection systems used for existing disks

SUMMARY

An information storage apparatus uses an optical data element (nano-grating) with features that are smaller than the wavelength of light. The optical data element alters one or more properties of the light such as reflected amplitude, polarization, phase, wavelength, and spatial orientation to encode data in a massively multi-level format.

DESCRIPTION OF DRAWINGS

These and other features and advantages of the invention will become more apparent upon reading the following detailed description and upon reference to the accompanying drawings.

FIG. 6a shows the measured phase retardation as function of wavelength (square). The line is the calculation based on effective medium theory.

FIG. 6b shows measured phase retardation as function of incident angle. The measurement was done at two different rotation scenarios, rotation axis parallel to the optical axis (diamond) and perpendicular to the optical axis (square).

FIG. 6c shows measured phase retardation as function of temperature.

DETAILED DESCRIPTION

Figure 1:
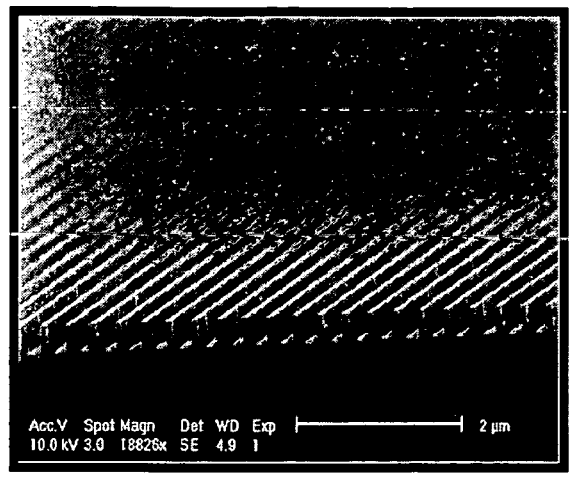
FIG. 1 illustrates a sub-optical wavelength reflective nano-grating structure as used in the present invention.

Nanostructures are structures with one or more dimensions measured in less than a hundred nanometers. Nanostructures produce a broad range of important and often unexpected optical effects. FIG. 1 illustrates a sub-optical wavelength reflective nano-grating structure. These structures have been fabricated by a company called NanoOpto Corp. of Somerset, N.J. and used for significant utility for other non-related optical devices. By operating in the subwavelength realm, nanostructure-based optical structures can reach and sometimes cross the boundary between classical and quantum optics. These functions include polarization, phase, wavelength, and refractive index filtering or modification. Thus, nano-optical structures offer the potential for creating ROM and WORM optical data elements (ODEs) for which data is encoded in a massively multi-level format.

In the present invention, data is recorded by fabricating in optical ROM media a small subdivision either the size of the drives focused laser stylus or in an array of several of these elements of that total size (laser spot size) comprised of these subwavelength optical grating structures. Reflected or transmitted light from the small data subdivision will alter the incident lights phase in correspondence to the encoding of the grating or grating array.

Resolution to greater than $1/120$ wavefronts for a single subwavelength grating is described in the present literature from NanoOpto. Combined array structure could be detected in combined or convolved form and provide even greater multilevel combinations.

There are several potential embodiments for detection and decoding of the phase state of the information bearing optical signal. One embodiment would be a two-dimensional position sensitive photosensitive detector covered first with a linear polarizer and on top of the polarizer a linear array of small progressively larger phase retarder elements starting from the center of the detector. In particular, the small element at the center would have 0 degrees of retardation for the optical wavelength of the drives laser. The elements to either side of this center element would have 10 degree (right side) and −10 degree (left side) phase retardation. The next would have two elements to either side of these central three elements would have 20 degree (right side) and −20 degree (left side) phase retardation. This pattern is repeated across the detector until the full cycle of rotation of phase is encompassed. These phase retarder element can be of the NanoOpto subwavelength type or more traditional bi-refringent thin film composition. The ten-degree increment described in only one embodiment, other sub divisional angular increments can be used.

The amplitude from the differential output signal of the bi-directional position detector will be in proportion to the aggregate phase retardation of the data signal. This detector system for detecting phase retardation of light at a high rate (very fast) is a novel invention as well.

Another method that is used in Magneto-Optical data storage devices for detection and measurement of light's phase rotation is the Wollaston prism. This prism divides the orthogonal polarizations into two separate paths for detection of each. The ratio of amplitude between detectors monitoring these paths is a measure of the lights phase or polarization state. In an MO drive data is encoded as a Kerr rotation from RE/TM alloys typically less than 0.5 degrees. Drives on the market hence can measure to a relation of better than 0.5 degrees of phase rotation in the reflected laser stylus. With a total of 180 degrees of phase available for encoding data and if 0.5 degree division between states can be fabricated this foretells 360 data states in a single data storage location. This translates into a capacity and transfer rate increase of 8.5 times.

Figure 2:
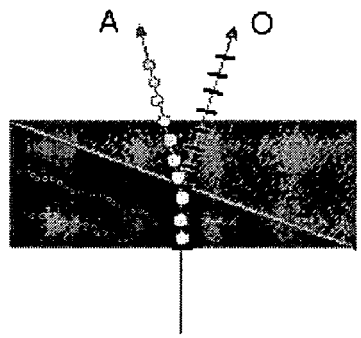
FIG. 2 is a Wollaston prism consisting of two orthogonal calcite prisms which are cemented together on their base.

The Wollaston prism as shown in FIG. 2 consists of two orthogonal calcite prisms which are cemented together on their base. Their optical axes lie perpendicularly to each other and perpendicular to the direction of propagation of the incident light. Light striking the surface of incidence at right angles is refracted in the first prism into an ordinary (O) and an extraordinary (A) ray. However, these two rays continue to propagate in the same direction. As the optical axis of the second prism is perpendicular to that of the first, the ordinary ray (O) becomes an extraordinary ray (A) at the boundary surface. Its refractive index changes from n(O) to n(A); as n(A)<n(O) the extraordinary ray is refracted away from the axis of incidence. The opposite applies to the original extraordinary ray, now an ordinary ray: overall, therefore, the two partial rays display very different directions.

Figure 3:
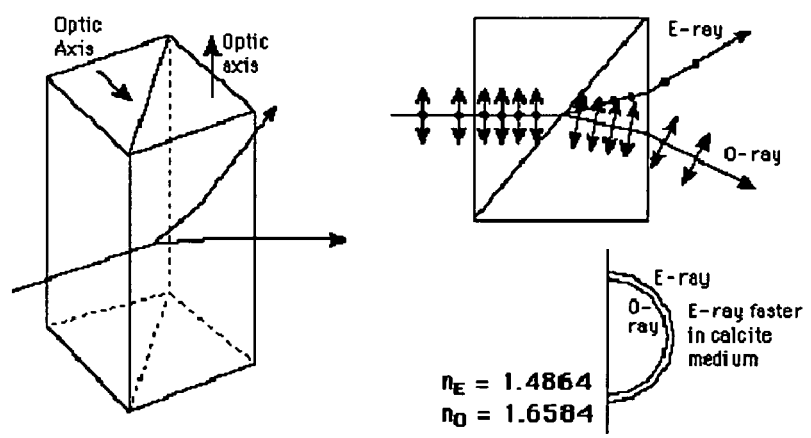
FIG. 3 is a Wollaston prism made up of two right triangle prisms with perpendicular optic axes.

The Wollaston prism is a polarizing beam splitter, preserving both the O- and E-rays. It is usually made from calcite or quartz. The Wollaston prism as shown in FIG. 3 is made up of two right triangle prisms with perpendicular optic axes. At the interface, the E-ray in the first prism becomes an O-ray in the second and is bent toward the normal. The O-ray becomes an E-ray and is bent away from the normal. The beams diverge from the prism, giving two polarized rays. The angle of divergence of these two rays is determined by the wedge angle of the prisms. Commercial prisms are available with divergence angles from 15° to about 45°. They are sometimes cemented with glycerine or castor oil, and sometimes not cemented if the power requirements are high.

A photonic grating structure with feature size larger than wavelength of light generates high-order diffraction for both transmission and reflection beams. As feature size approaches the wavelength of light, the number of the high-order diffractive beams decreases proportionally. In the regime where the feature size is smaller than the wavelength of light, only normal direction transmission and reflection, i.e., the zero-order diffraction modes, exist and all high-order diffraction modes become evanescent.

Fabrication of subwavelength optical structures is actually re-engineering material's optical property such as refractive index. The refractive index of subwavelength optical structures can be calculated by the effective index theory. The refractive index can be engineered by selecting index of base material, index of filled-in material and the volume ratio of the two which is also called duty cycle. By engineering these three parameters, ODEs with various index profiles and therefore different modes of optical multi-level information encoding can be created. In addition, one can tailor the shape of subwavelength optical features, which opens an additional dimension for new reflective state encoding. For instance, fabrication of subwavelength optical gratings on isotropic material substrates breaks in-plane symmetry of the material. It leads to various polarization-encoding ODES, such as phase retards, polarizers, and polarization selective mirrors.

The following design principles allow the realization of a nano-optic ODE such as a phase retarding optical encoding element with the highest possible efficiency. A simple method used to model optical characteristics of nano-structures is based on effective medium theory (EMT). Under normal incidence, the effective indices for the TE and TM polarizations of a nano-optic grating can be estimated from the second-order effective medium theory (EMT):

$$n_{TE}^{(2)} = [n_{TE}^{(0)2} + (1/3)(\Lambda/\lambda)^2 \pi^2 F^2 (1-F)^2 (n_2^2 - n_1^2)^2]^{1/2}$$

$$n_{TM}^{(2)} = [n_{TM}^{(0)2} + (1/3)(\Lambda/\lambda)^2 \pi^2 F^2 (1-F)^2 (1/n_2^2 - 1/n_1^2)^2 n_{TE}^{(0)2} n_{TM}^{(0)6}]^{1/2}$$

where F is the duty cycle of the grating, $n_1$ and $n_2$ are the indices of filling material and the grating material, respectively, and $n_{TE}^{(0)} = [Fn_1^2 + (1-F)n_2^2]^{1/2}$ and $n_{TM}^{(0)} = \{n_1^2 n_2 / [Fn_2^2 + (1-F)n_1^2]\}^{1/2}$ are the effective indices of refraction for TE and TM waves provided by the zero-order EMT, respectively.

Figure 4:
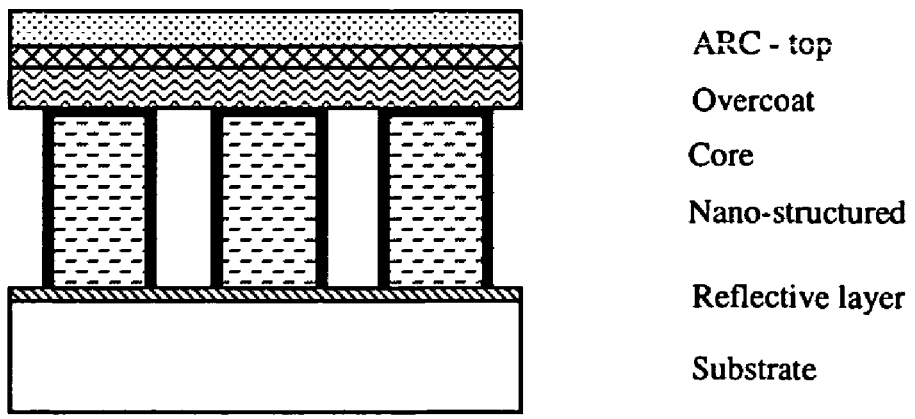
FIG. 4 is a schematic of the nanostructure based true zero-order quarter-wave retarder design.

As noted previously, nano-grating structures for phase encoding of multi-level information are examined. One-dimensional nano-structured gratings are made of homogeneous materials breaks in-plane symmetry of the material which leads to artificial birefringence property, i.e., form-birefringence. FIG. 4 illustrates this basic structure.

Figure 5:
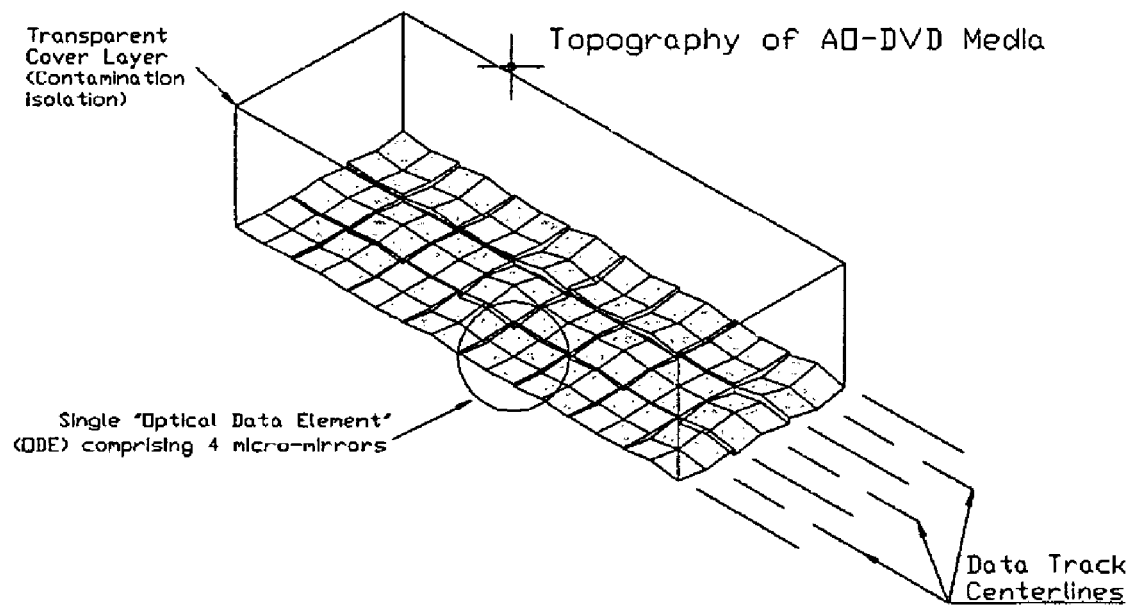
FIG. 5 is a topography of a subwavelength-sized phase encoded media structures for multilevel information storage.

FIG. 5 shows a graphic illustration of the general topography of three data tracks of media according to one embodiment of the invention. Each of the ODEs shown is a ¼ wave plate. Each has a fast and slow axis oriented slightly differently relative to the interrogating linearly polarized optical data read-back stylus. In this manner interaction with the polarization-changing ODE changes the relative magnitude and relative phase angle between TE and TM polarizations in the reflected beam. Alternatively, similar encoding could be achieved by using geometry differences in the nano-grating structure between ODEs encoded with a different state.

The captured beam is then optically relayed to a differential analyzer detection system much like that found in an M-O (magneto-optical) data storage drive. In this case the differential phase detecting optical element would be an intergrated nano-optical device rather than say a Wollaston prism. It is interesting to note that read back mechanism in an M-O drive is a slight change in the phase orientation (<½ degrees) of reflected light from the M-O media created by the magneto-optic Kerr effect.

The combination of any two orientations for angles "alpha" and "theta" and the run-length for the micro-mirrors can be used to represent a specific digital state. The number of combinations, which are possible to resolve with the drive embedded solid-state position-sensitive photo detectors, determines how many bits of data can be encoded with a single ODE array. Equation 1 calculates the number of bits that can be encoded in a single ODE.

$$\text{Bits}_{ODE} = \text{Log}_2 [(\#RL)^{DTR} \cdot (\#\alpha \cdot \#\theta)^{\#MM}] \quad (1)$$

where,
RL=numbers of micro-mirror run-length states
DTR=down-track rows of micro-mirrors within an ODE
α=number of micro-mirror rotational angular states
θ=number of micro-mirror tilt angular states
MM=number of micro-mirrors in an ODE.

In order to make direct AO comparisons to capacity points on CD and DVD media, it is helpful to calculate the equivalent size of a user data bit for these standards. That calculation reveals that for both CD and DVD, the equivalent size of a user bit on the media is the width of a data track and about ⅓ that dimension in length. This compressed aspect ratio is due largely to the run-length limited encoding implemented in these standards.

If, for example, the run-length term in
Equation 1 is set to #RL=3 and DTR=2 as with the AO-DVD embodiment described so far, we see this term equals 9 or slightly greater than 3 bits ($2^3$). Hence, Equation 1 can be rewritten, dropping this term, for direct capacity increase factor calculation.

$$\text{Capacity Factor} = \text{Log}_2[(\#\alpha \cdot \#\theta)^{\#MM}] \quad (2)$$

For example, for a drive with an NA=0.7, the approximate maximum micro-mirror tilt angle (θ) is 22 degrees. There are 4 micro-mirrors in each ODE; hence, 90 degrees of rotational orientation (α) is allocated to each. The product of alpha and theta is 1024 in Equation 2 if we assume we are able to fabricate micro-mirror angular states about 1.5 degrees apart. Finally, using MM#=4 as described, the calculated "Capacity Factor" is 40×. For this example, remarkably, there are almost 100 trillion ($1 \times 10^{12}$) more levels or possible combinations encodable in an AO-DVD ODE than is possible in the equivalent media area on a DVD. It should be noted that this "Capacity Factor" calculation assumes that data overhead in the format for error correction, modulation and sector information is equivalent to the standard being compared (DVD or CD).

Table 1 shows "Capacity Factor" sensitivity as a function of fabricatable micro-mirror state separation.

TABLE 1

| Angular State Separation Sensitivity | | | | | |
|---|---|---|---|---|---|
| State Separation Angle | 10° | 5° | 3° | 1.5° | 0.5° |
| Capacity Factor | 17.3X | 25.3X | 31.2X | 39.2X | 51.9X |
| ODE Multi-Levels | $1.6 \times 10^5$ | $4.1 \times 10^7$ | $2.4 \times 10^9$ | $6.2 \times 10^{11}$ | $4.1 \times 10^{15}$ |

From Table 1 we should note that if the separation in angular states were to increase from 1.5 degrees to 10 degrees (6.7×), the capacity would only decrease by 2.3×. This benefit is due to the exponential nature of Equations 1 and 2.

Other unique features of the media format include phase calibration ODEs with known phase retardation orientation to be included in data sector headers. In this manner the drive is able to compensate for thermal variation in the media and the drive.

Next the variation in performance of our phase retarder ODE due to wavelength dependence, plane wave angular incidence and nano-grating temperature variation is examined empirically. FIG. 6a shows the measured phase retardation as function of wavelength (square). The line is the calculation based on effective medium theory. FIG. 6b shows measured phase retardation as function of incident angle. The measurement was done at two different rotation scenarios, rotation axis parallel to the optical axis (diamond) and perpendicular to the optical axis (square). FIG. 6c shows measured phase retardation as function of temperature.

Nano-optics, in both their discrete and integrated forms, are all manufactured in single uniform process: nano-imprint manufacturing. This process is combination of printing and semi-conductor manufacturing—both of which are high volume, highly repeatable, and highly scalable processes.

Figure 7:
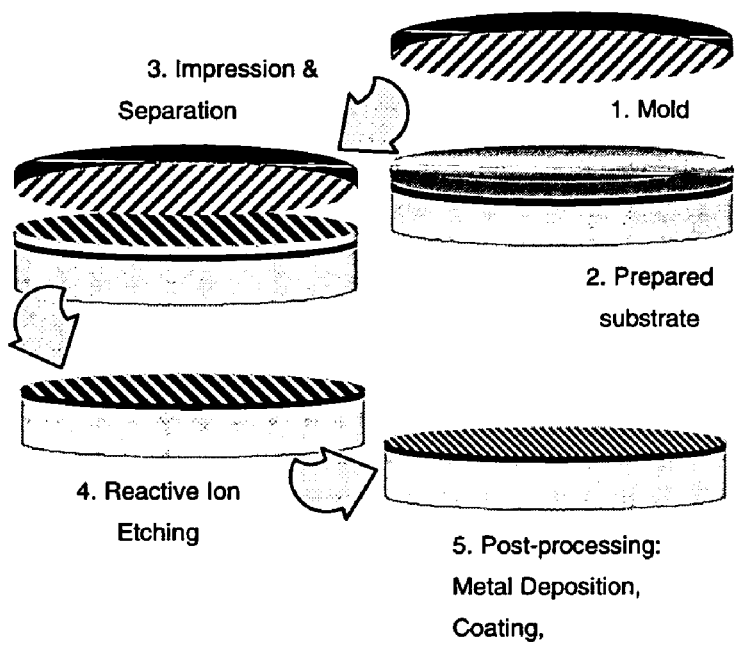
FIG. 7 illustrates the nano-imprint manufacturing process.

The nano-imprint manufacturing process is shown in FIG. 7 and comprises preparing a substrate, generically consisting of an optical substrate, a layer of target material, and a layer of pliable polymer resist. The substrate may be a 100 mm, 150 mm, or 200 mm diameter wafer. A mold patterned with the complement, or negative, of the desired nano-structure, is impressed—under uniform, high pressure—into the polymer resist. The mold is usually identical in diameter to the substrate. The source of the mold and its attributes are described in more detail later in this section.

Following a curing operation that sets the polymer, the mold is separated from the substrate, leaving the desired pattern in the polymer resist layer. Reactive ion etching is used to transfer the pattern to the target material (which may be the substrate itself) by uniformly etching away the resist. Depending on the specific device being produced, additional processing steps including metal layer deposition and coating may be applied. The final wafer output is tested for uniformity and optical properties. The wafer is then diced into appropriately sized nano-optic chips.

A necessary predecessor to the nano-imprint manufacturing operation of an optical ROM disk is the creation of a mold patterned with the negative image of the desired nano-structure array. A new mold is required when a new disc title is to be mass produced. A master mold is created by fully specifying the desired nano-structure pattern via design software. Critical parameters are shape, aspect ratios, period, and any spatial variations in those parameters. Depending on the complexity of the structure, a master mold may be patterned via e-beam lithography, gray-scale e-beam lithography or other techniques. The master mold may be patterned in a multi-step process to achieve more complex patterns. Lithography steps may be repeated or overlaid. Step-and-repeat techniques may be used to replicate a complex pattern.

Once a master mold has been created, trial wafers are processed to verify that the desired optical massively multi-level optical data storage properties are realized for the resulting disc. The master mold is then replicated through a cloning process. The clone mold is then used in the manufacturing process, while the master is archived.

The creation of a manufacturing ready mold can take anywhere from a many hours to several weeks, depending on pattern complexity and the novelty as well as the size of the optical ROM media. The useful life of a mold in manufacturing in steady-state production with appropriate handling and cleaning, is expected to be comparable to those for DVD ROM manufacture.

Figure 8:
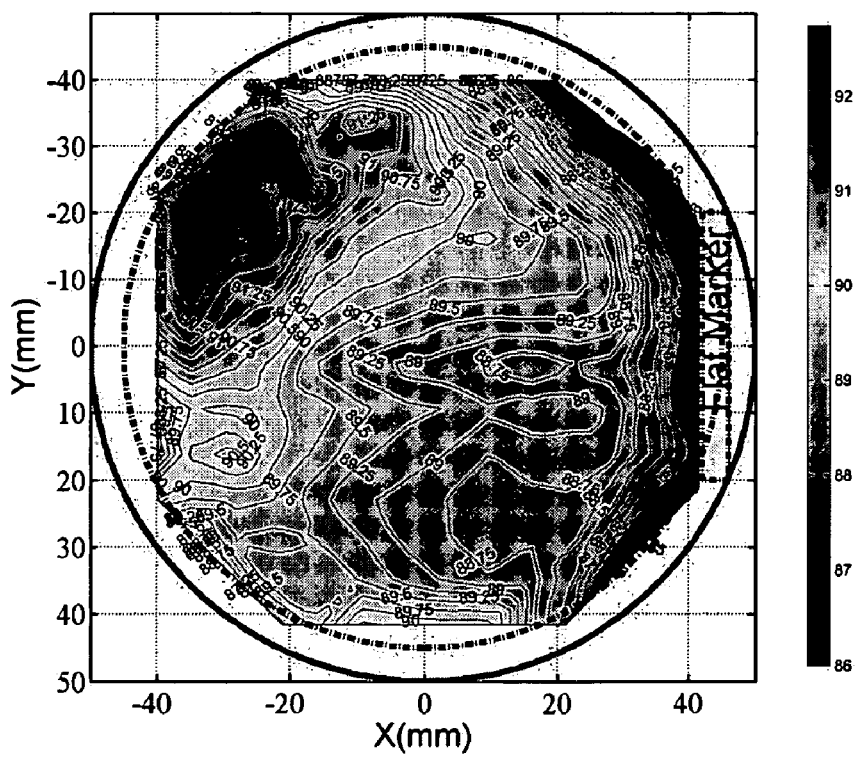
FIG. 8 is a wafer level performance distribution of phase retardation of a 4" in-diameter nano-structured true-zero-order quarter waveplate wafer designed for center wavelength at 650 nm.

Relative to process uniformity over large area such as a ROM optical data storage disc, FIG. 8 is a wafer level performance distribution of phase retardation of a 4" in-diameter nano-structured true-zero-order quarter waveplate wafer designed for center wavelength at 650 nm.

Figure 9:
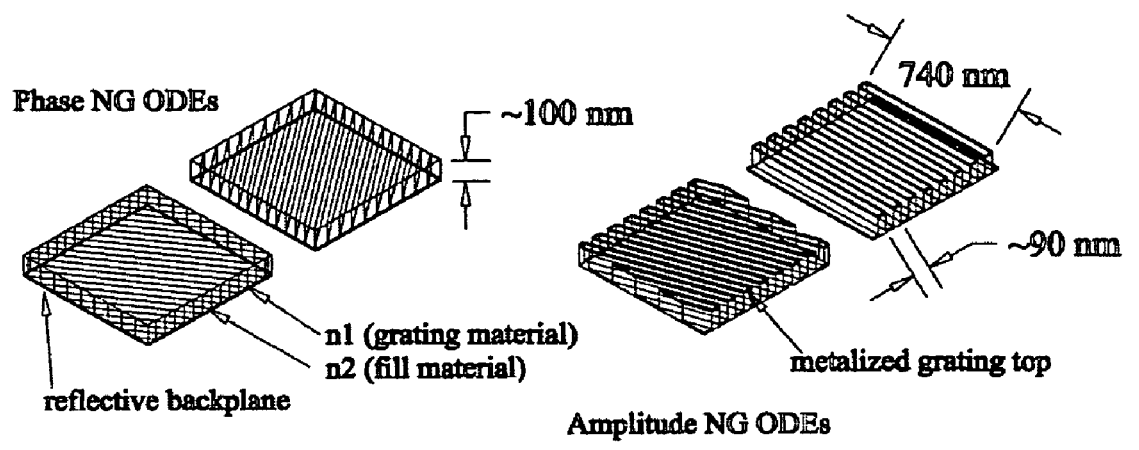
FIG. 9 illustrates two different data states for multi-level NG-DVD media. Each illustrated element is a single ODE, which is 740 nm square, roughly the size of a DVD laser stylus. Both amplitude encoded data states and phase encoded states are shown.

FIG. 9 shows physical illustrations of two different data states for multi-level NG-DVD media. Each illustrated element is a single ODE, which is 740 nm square, roughly the size of a DVD laser stylus. Both amplitude encoded data states and phase encoded states are shown.

For the amplitude encoded ODEs, data is encoded in a multi-level fashion via changes in relative orientation of the nano-grating relative to the interrogating laser stylus. For the phase-encoded ODEs, multi-level data is created via the vectorized phase retardation of reflected light from a ¼ wave plate (two pass ⅛ WP) when the OED is rotated relative to the interrogating linearly polarized laser stylus. Each ODE has its fast and slow axis oriented slightly differently for each multi-level data state Combining these multi-level state mechanisms (amplitude and phase) with positional data encoding, much like that described for the AO-DVD format, is possible via application of blazing to the nano-grating structures. Further data storage capacity enhancement for this technology may also include arrayed structures in a single ODE producing multi-spot data states. Inherent with this multi-level encoding approach are also significant transfer rate increases.

Nano-optic structures, in both their discrete and integrated forms, are all manufactured in single uniform process: nano-imprint manufacturing. This process is combination of printing and semi-conductor manufacturing—both of which are high volume, highly repeatable, and highly scalable processes. Manufacturing capability, as well as, shipping optical elements with grating line widths down to 50 nm are presented.

Subwavelength periodic nano-grating reflective structures in media are shown to be capable of encoding an interrogating focused laser beam into multi-level data states upon reflection with empirical data. The ability to hybridize NG-DVD/AO-DVD technology within a DVD drive makes this ROM technology an appealing alternative for the future of low-cost optical distribution media. This technology is scalable to future shorter wavelength optical drive technologies. Capacities in the terabyte range for low-cost 120 mm discs are envisioned The invention as disclosure also includes using blazed nano-grating to encode data in a multilevel format which would include but not be limited to multiplex spatial encoding of data (change blaze angle and orientation of nano-grating), changes in polarization (rotate nano-grating), reflective amplitude (use pillared graing structure and change duty cycle of reflective pillars), phase retardation encoding (use different fill materials for second index material in grating structure, change duty cycle of grating and orientation of grating).

The invention as disclosure also includes recordable/rewriteable media is invented via using the phase retarder structure with a fill material that is a photo addresable polymer (PAP) such as those developer by Bayer Chemical Corp. See copied text later in document. Fill material may also include any other type of photo induced reflection changing or index changing material (phase changing materials).

The invention as disclosure also includes storage of holographic images of information content in optical data elements approximately the size of or small than a laser stylus reading and writing them is included in the embodiments of this invention.

The invention as disclosure also includes multi laser beam systems are included in this invention. Multiplexing images via the use of dynamically/electronically changing diffraction gratings such a those produced by "Silicon Light Machines" CA, USA are also include as an embodiment of a parallel writing mechanism.

Numerous variations and modifications of the invention will become readily apparent to those skilled in the art. Accordingly, the invention may be embodied in other specific forms without departing from its spirit or essential characteristics.

What is claimed is:

1. An information storage apparatus comprising a plurality of optical data elements, each comprising:
   a planar array of parallel grating elements with features that are smaller than the wavelength of light, wherein the planar array of parallel grating elements are configured to alter one or more properties of an incident light comprising one of reflected amplitude, polarization, phase, wavelength and spatial orientation,
   wherein the altered properties encode data in a massively multi-level format.

2. The information storage apparatus of claim 1, wherein property of the incident light altered by the optical data element is reflected amplitude.

3. The information storage apparatus of claim 1, wherein the property of the incident light altered by the optical data element is polarization.

4. The information storage apparatus of claim 1, wherein the property of the incident light altered by the optical data element is phase.

5. The information storage apparatus of claim 1, wherein the property of the incident light altered by the optical data element is wavelength.

6. The information storage apparatus of claim 1, wherein the property of the incident light altered by the optical data element is spatial orientation multiplexing.

7. The information storage apparatus of claim 1, wherein the optical data element comprises arrays of subwavelength features which cause plasmonic resonate effects at their locality to alter the state of multi-level data emitted from the structure.

8. The information storage apparatus of claim 7, wherein the subwavelength features include round pillars.

9. The information storage apparatus of claim 7, wherein the subwavelength features include square pillars.

10. The information storage apparatus of claim 7, wherein the subwavelength features include holes of various sizes and shapes.

* * * * *